United States Patent [19]

Dardi et al.

[11] E Re. 31,339

[45] Reissued Aug. 9, 1983

[54] PROCESS FOR PRODUCING ELEVATED TEMPERATURE CORROSION RESISTANT METAL ARTICLES

[75] Inventors: Louis E. Dardi, Muskegon; William R. Freeman, Jr., North Muskegon, both of Mich.

[73] Assignee: Howmet Turbine Components Corporation, Muskegon, Mich.

[21] Appl. No.: 78,565

[22] Filed: Sep. 24, 1979

Related U.S. Patent Documents

Reissue of:

[64] Patent No.: 4,145,481
Issued: Mar. 20, 1979
Appl. No.: 821,546
Filed: Aug. 3, 1977

[51] Int. Cl.[3] ..... B05D 3/00; B32B 15/00

[52] U.S. Cl. ..... 428/678; 148/4; 204/35 R; 204/37 R; 204/38 B; 204/180 R; 204/192 N; 427/34; 427/38; 427/42; 427/250; 427/376.8; 427/377; 427/383.9; 427/423; 428/679; 428/680

[58] Field of Search ..... 427/34, 375, 376 G, 427/376 H, 377, 383 D, 405, 423, 367, 376.8, 383.9; 428/667, 668, 678, 679, 680, 652; 75/134 F, 171; 204/35 R, 37 R, 38 B; 148/4

[56] References Cited

U.S. PATENT DOCUMENTS

| | | | |
|---|---|---|---|
| 3,361,562 | 1/1968 | Ulrich et al. | 427/376 H |
| 3,594,219 | 7/1971 | Maxwell et al. | 427/383 D |
| 3,620,693 | 11/1971 | Sama et al. | 427/383 D |
| 3,676,085 | 7/1972 | Evans et al. | 29/194 |
| 3,754,903 | 8/1973 | Goward et al. | 75/171 |
| 3,758,347 | 9/1973 | Stalker | 148/4 |
| 3,869,779 | 3/1975 | Gedwill et al. | 428/678 |
| 3,873,347 | 3/1975 | Walker et al. | 427/250 |
| 3,928,026 | 12/1975 | Hecht et al. | 75/134 F |
| 3,961,098 | 6/1976 | Bessen | 427/34 |
| 3,978,251 | 8/1976 | Stetson et al. | 427/405 |
| 4,070,507 | 1/1978 | Stueber et al. | 427/383 D |
| 4,246,323 | 1/1981 | Bornstein et al. | 428/678 |

OTHER PUBLICATIONS

D. B. Arnold et al., "Process for High-Integrity Casting", Air Force Materials Lab., Air Force Systems Command, Wright-Patterson, IR-162-2 (II), Nov. 1972.

Charles B. Boyer et al., "Solid-State Bonding and Consolidation of Powders under Hot-Isostatic Pressure", Am. Soc. of Mechanical Engineers, New York, Dec. 1971.

Lou Frost, New Manufacturing Processes and Techniques, Memo 33, North American Rockwell Aerospace & Systems Group.

*Primary Examiner*—Delbert E. Gantz
*Assistant Examiner*—William Leader
*Attorney, Agent, or Firm*—McDougall, Hersh & Scott

[57] ABSTRACT

A process for providing coatings on metal articles whereby the articles will be resistant to corrosion at elevated temperatures. The process involves the application of an overlay on an article surface, the overlay comprising a ductile metal of a composition normally resistant to corrosion at elevated temperatures. An outer layer of aluminide or metal which is resistant to corrosion at elevated temperatures but which is subject to embrittlement at such temperatures is applied to complete the coating. Porosity in the coating is then eliminated and a high integrity corrosion resistant coating not subject to cracking is obtained by heating the article in a gaseous atmosphere to elevated temperature and simultaneously applying isostatic pressure to the article.

11 Claims, 5 Drawing Figures

PROCESS FOR PRODUCING ELEVATED TEMPERATURE CORROSION RESISTANT METAL ARTICLES

Matter enclosed in heavy brackets [ ] appears in the original patent but forms no part of this reissue specification; matter printed in italics indicates the additions made by reissue.

This invention relates to metal articles which are subjected to elevated temperatures during use. In particular, the invention is concerned with a process for significantly improving the corrosion resistance of such articles under such conditions whereby more satisfactory performance and longer life for such articles can be obtained.

There are many applications which involved elevated temperature exposure of metal components. Such applications involve, for example, various aerospace applications and land operations such as components utilized in gas turbine engines.

In all such applications, it is important to provide some means for preventing undue corrosion of the components involved since such corrosion will materially shorten the useful life of the components, and can create significant performance and safety problems. Various alloys including most superalloys are characterized by a degree of corrosion resistance; however, such resistance is significantly decreased when unprotected superalloy components are exposed at the operating temperatures involved in certain systems. For that reason, such components have been provided with coatings, such as aluminide coatings, which increase the corrosion resistance at the extreme operating temperatures.

Aluminide coatings are applied by pack cementation process. In this process, the substrate chemistry and the processing temperature exert a major influence on coating chemistry, thickness and properties. Specifically, the coatings comprise a hard, brittle outer layer and a hard, brittle multi-phase sublayer that can crack when subjected to operating conditions. This leads to poor fatigue properties and the cracks also materially reduce the corrosion resistance of the coated components.

Another class of coatings is the MCrAlY overlay coatings where M stands for a transition metal element such as Fe, Co, or Ni. Presently, these coatings are applied by vacuum vapor deposition of MCrAlY alloy on a superalloy surface. Such vapor coatings have been shown to have certain advantages over aluminide coatings in providing extended life to turbine components. Unfortunately, such coatings may contain radially oriented defects which are created during the vapor deposition processing. Such defects are the sites of corrosion attack at high temperature which can lead to premature failure of the coated part. Further, the vapor coatings are relatively costly to produce and require relatively expensive manufacturing equipment.

In the past, several low cost methods such as plasma spraying, slurrying sintering, etc. have been investigated to process MCrAlY coatings on superalloys. However, most of these attempts have resulted in application of a porous coating which prematurely fails due to corrosion attack.

It is an object of this invention to provide metal articles which are particularly capable of resisting corrosion under elevated temperature operating conditions.

It is a more specific object of this invention to provide and improved process for the treating of superalloys and other metals exposed to elevated temperature operations whereby such articles will resist corrosion under such conditions.

It is also an object of this invention to provide a process for coating metal articles whereby coatings which are highly resistant to corrosion at elevated temperatures can be utilized without embrittlement or cracking so that the physical properties of the articles and the corrosion resistance thereof remain at high levels during use of the articles.

A more specific object of the invention is to provide a high integrity plasma sprayed metallic coating for enhanced corrosion protection and ductility.

These and other objects of this invention will appear hereinafter and for purposes of illustration, but not of limitation, the accompanying drawing illustrates as follows.

Figure 1:
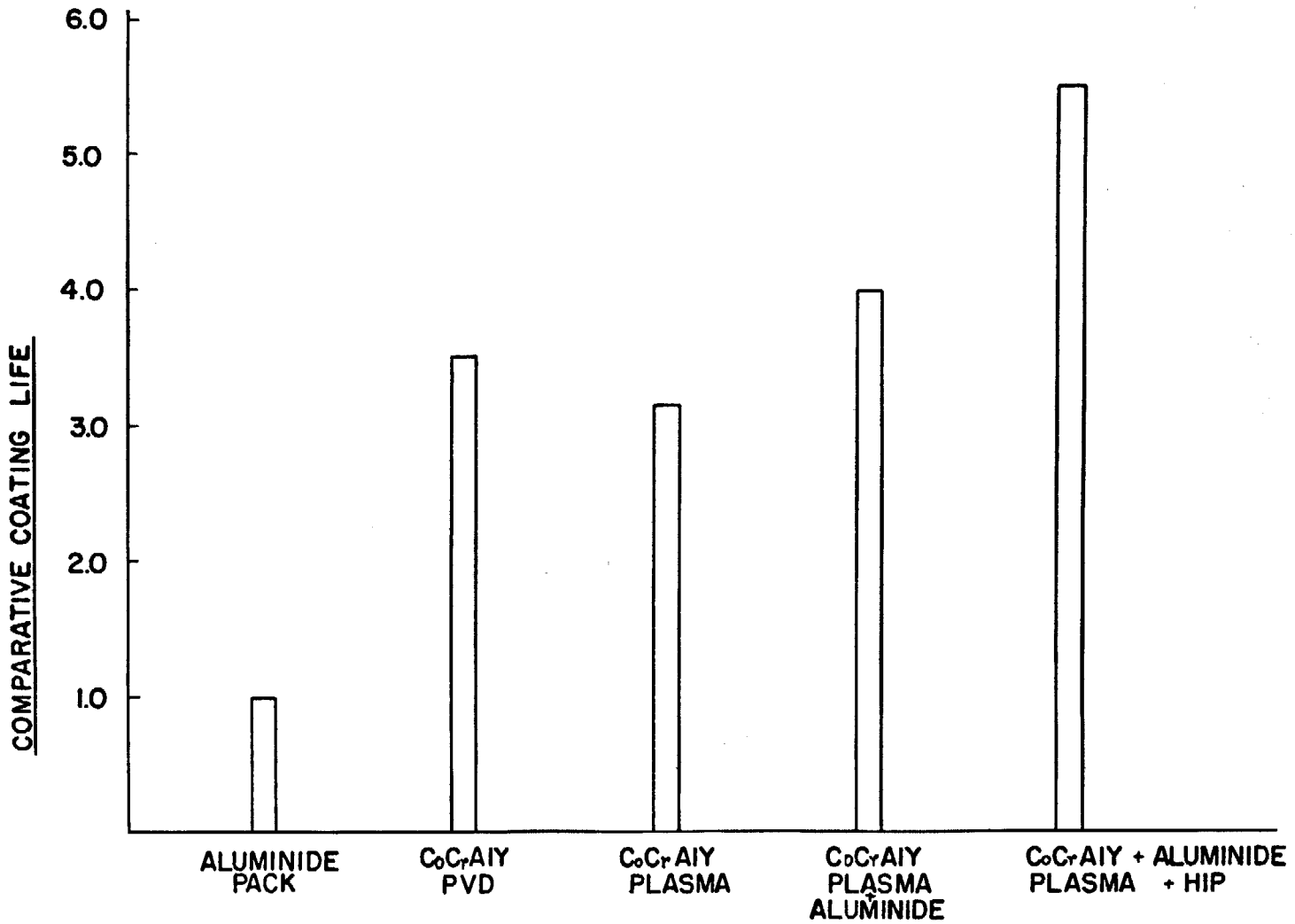
FIG. 1 is a chart comparing the various coatings for the nickel base superalloys in terms of durability at 1750° F. peak temperature.

This invention generally involves a process for producing a coating on metallic articles for purposes of rendering the articles resistant to corrosion at elevated temperatures. The process first involves the application of a ductile metallic overlay on the article surface. The overlay is of a composition normally resistant to corrosion at elevated temperatures.

An outer layer is applied over the overlay, the outer layer also being formed of a material resistant to corrosion at elevated temperatures. The process thereafter involves subjecting the articles to a hot isostatic pressing operation wherein the article is simultaneously subjected to high temperature and high pressure applied through a gaseous atmosphere. The temperature and pressure relationship is such that porosity in the coating composed of the overlay and outer layer will be eliminated and the chemical composition of the coating will be modified by inter-diffusion between the overlay, the outer layer and the substrate at such temperatures. The resultant high integrity coating will be suitable for performance under elevated temperature conditions being developed.

The ductile metallic overlay which is applied directly to the article surface preferably comprises an alloy having as a base element a transition metal comprising cobalt, iron or nickel. Amounts of chromium, aluminum and/or yttrium are alloyed with the base metal pursuant to the preferred practice of the invention.

The ductile metallic layer can be conveniently applied by plasma spraying or by other conventional means such as pressure bonding, physical vapor deposition, sputtering, ion plating, and slurrying sintering.

Where plasma spraying is employed, the overlay material is heated to a highly plastic, or molten state such that wetting or deformation interlocking of the particles being deposited is accomplished as the particles strike the substrate surface. Plasma spraying is particularly desirable since it is a generally less costly technique for accomplishing the overlay coating, and since the technique is applicable to all contemplated coating compositions.

The metallic overlay which is thus achieved will, because of the composition of the coating, generally improve the elevated temperature corrosion resistance of the article coated, however, the coatings are characterized by a degree or porosity which adversely affects such elevated temperature characteristics.

As indicated, this invention involves the application of an outer layer to the overlay. This outer layer also comprises a material which is resistant to corrosion at elevated temperatures. This material, like the aforementioned overlay, suffers from certain deficiencies from the standpoint of elevated temperature corrosion resistance if used as the only coating on the article involved. Aluminide coatings represent one type of outer layer contemplated, and such coatings, when applied directly to a substrate, have a tendency to become embrittled and/or to develop cracks whereby the utility of such coatings for protection against corrosion is minimized.

In addition to aluminide coatings, the invention contemplates other layers such as precious metals and their alloys, these metals/alloys also being used in combination with the overlay described. The combination eliminates the deficiencies which are found when either the overlay materials or the outer layer materials are used alone in conjunction with a given substrate. This elimination of deficiencies occurs, in particular and in accordance with this invention, when the articles having the overlay and outer layer are hot isostatically pressed. Gold, palladium, platinum and rhodium are contemplated as precious metals suited for the practice of the invention.

In the case of aluminide coatings, the outer layer may be applied by pack cementation or other conventional techniques such as dipping, spraying, metallizing and electrophoresis. Where precious metals are used for purposes of forming the outer layer, conventional techniques such as plasma spraying, ion plating, electron beam or vapor deposition, sputtering, slurry sintering or pressure bonding may be utilized.

The conditions for hot isostatic pressing contemplated in accordance with this invention may be determined by reference to the conditions recommended for the substrate. Thus, hot isostatic pressing techniques are recommended for superalloys and other materials utilized for elevated temperature applications, particularly for purposes of eliminating defects which develop during casting. Generally, such techniques involve the application of pressure through a gaseous atmosphere in the order of 10,000 to 50,000 psi. The temperature in the autoclave employed for the hot isostatic pressing will generally be in a range of 50° below the gamma prime solvus temperature of the castings up to the solidus temperature of the castings.

Where aluminide outer layers are utilized, the presence of aluminium under the conditions of hot isostatic pressing leads to the enrichment of the underlying coating. In addition, a selective outward diffusion of base substrate element, such as nickel in the case of nickel base alloy substrates, occurs into the coating during hot isostatic pressing. This diffusion modifies the chemical composition of the MCrAlY overlay aluminide outer layer. Thus, a failsafe system is provided. The aluminide layer has a lessened tendency to crack because it is supported by a ductile and sound (defect free) layer, not a brittle multiphase layer that is conventionally the case. If a crack occurs in the aluminide outer layer, the ductility of the overlay restricts its propagation. Widespread oxidation of the overlay does not occur because the completely dense and chemically modified MCrAlY overlay is oxidation/corrosion resistant.

Where precious metals are employed, the advantages referred to are also available. Thus, any tendency of such metals to embrittle or crack when applied directly to a substrate is eliminated by interposing the overlay coating and as a result of the subsequent hot isostatic pressing.

The application of the two layers has the further advantage of serving to encapsulate the article involved whereby surface connected defects in the article will not be exposed to the high pressure atmosphere during hot isostatic pressing. The coatings thereby function as a means for achieving elimination of such surface connected defects since, as set forth in prior teachings, the temperature and pressure conditions of the hot isostatic pressing will result in metal movement to the extent that such defects are eliminated.

The coatings referred to herein, when subjected to the hot isostatic pressing, are characterized by elevated temperature fatigue resistance and ductility in addition to the corrosion resistance referred to. This constitutes a necessary feature of such coatings in view of the application involved. Thus, the nickel base and cobalt base superalloys as well as dispersion strengthened alloys, composites, and directional eutectics which are contemplated for treatment in accordance with this invention are employed in applications where fatigue resistance and ductility at elevated temperatures are critical factors.

As noted, the optimum overlay composition comprise a cobalt, iron or nickel base material with aluminum, yttrium and chromium additions. The aluminum values, whether initially included in the overlay or obtained from an aluminide outer layer, provides for $Al_2O_3$ formation with the attendant oxidation resistance. Yttrium and equivalent additions achieve the promotion of oxide adherents and the chromium values enhance the $Al_2O_3$ formation while also providing hot corrosion resistance.

Aluminide coatings when utilized alone will not consistently exhibit long-time oxidation, sulfidation and thermal fatigue resistance. These coatings typically contain continuous phases of limited ductility which tend to crack under high corrosive stresses. Once cracks develop, an oxidizing or other hot corrosive atmosphere can gain access to the underlying substrate. As indicated, the presence of the intermediate overlay coating, in combination with the hot isostatic pressing, avoids such problems. Thus, the advantages of an aluminide layer without the difficulties previously experienced can be obtained.

The utilization of the overlay coating also enables the efficient introduction of elements such as yttrium which have been difficult to incorporate in nickel aluminide coatings. Such elements are already incorporated in the overlay, and in addition, broader ranges of nickel and aluminum compositions in the aluminide layer can be achieved when an overlay is utilized whereby prior limitations on mechanical properties of the aluminide coatings can be avoided.

The following comprises an example of the practice of this invention.

EXAMPLE I

A typical nickel base superalloy of the type used in gas turbine engines was coated with CoCrAlY overlay. The superalloy, known as IN792+Hf, had a nominal composition of 0.15% C, 12.22% Cr, 9.04% Co, 1.97% Mo, 3.97% W. 3.92% Ta, 3.88% Ti, 3.57% Al, 0.85% Hf, 0.017% B, 0.10% Zr and balance nickel. The nominal composition of overlay was, by weight percent 23 Cr, 13 Al, 0.6 Y and the balance cobalt, and this coating was applied by a plasma spray process. The coating powder was sprayed using a high velocity gun (Mach 3) operating at 76 kw with argon and helium as primary and secondary gases, respectively. Spraying was performed in a chamber maintained at a pressure of 50 torr. The plasma spray parameters are summarized below:

| | |
|---|---|
| Gun to workpiece distance | 16 in. |
| Primary gas (argon) V | 600 CFH |
| P | 250 psi |
| Secondary gas (helium) V | 150 CFH |
| P | 250 psi |
| Voltage | 85 volts |
| Current | 900 amps |
| Powder Flow | 0.1 lb. PM |
| Carrier gas (argon) | 50 CFH |

The overlay coating was aluminized by the pack cementation method. This method is described in Freeman, et al. U.S. Pat. No. 3,625,750 issued on Dec. 7, 1971. The source of aluminum as a powder mixture consisting of 35% aluminium oxide, 67% chromium-/aluminum alloy and 0.02% to 0.05% ammonium chloride. The process is conducted at 1900° F. to 1950° F. in a reduced pressure atmosphere. The aluminized-overlay coating thus obtained was hot isostatically pressed at 2200° F. and 15 ksi pressure for two hours in argon atmosphere.

Figure 2:
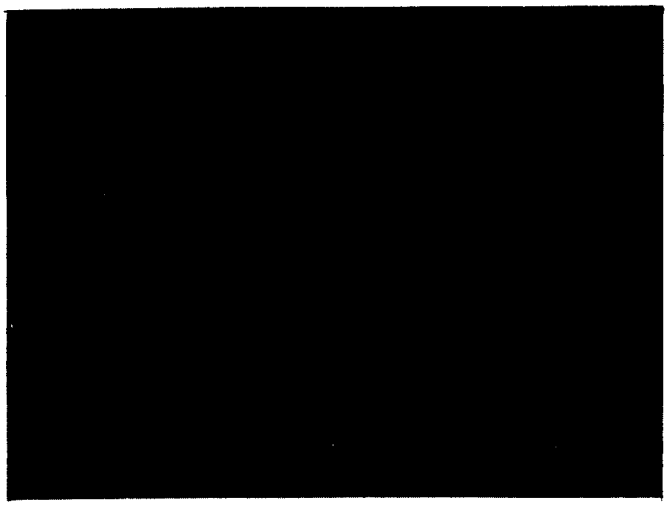
FIG. 2 is a photomicrograph at 500X of the coating matrix as plasma sprayed during the method of the present invention.
Figure 3:
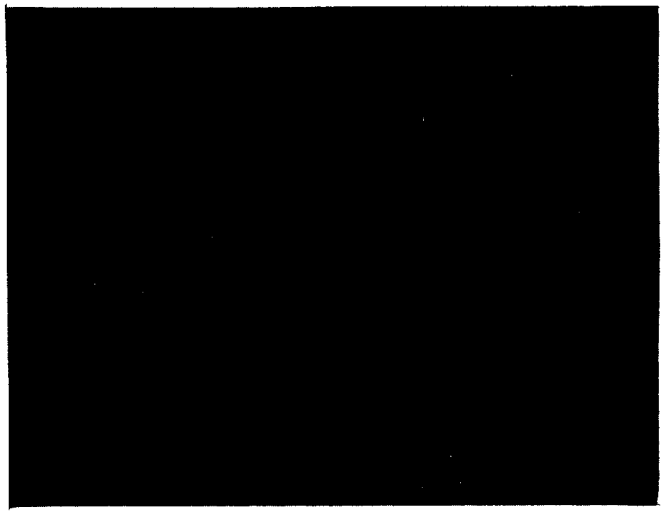
FIG. 3 is a photomicrograph at 500X of the coating matrix as plasma sprayed and aluminized and hot isostatically pressed during the method of the present invention.

A 500X photomicrograph of the plasma sprayed CoCrAlY overlay coating in the unetched condition is shown in FIG. 2. A high degree (5% by volume) of porosity is visible in the coatint which is an intimate mixture of CoAl ($\beta$) and Co-solid solution ($\gamma$) phases. FIG. 3 depicts the 500X photomicrograph of the coating which has been plasma sprayed, aluminized, and hot isostatically pressed. The coating contains no porosity. Examinations were also made of articles which were provided with plasma sprayed and hot isostatically pressed CoCrAlY coating in which a fair amount of porosity was observed. Where an aluminide coating was provided as an outer layer over a CoCrAlY overlay, no porosity was observed indicating that the hot isostatic pressing was effective to eliminate the porosity only after application of the aluminide coating.

Figure 4:
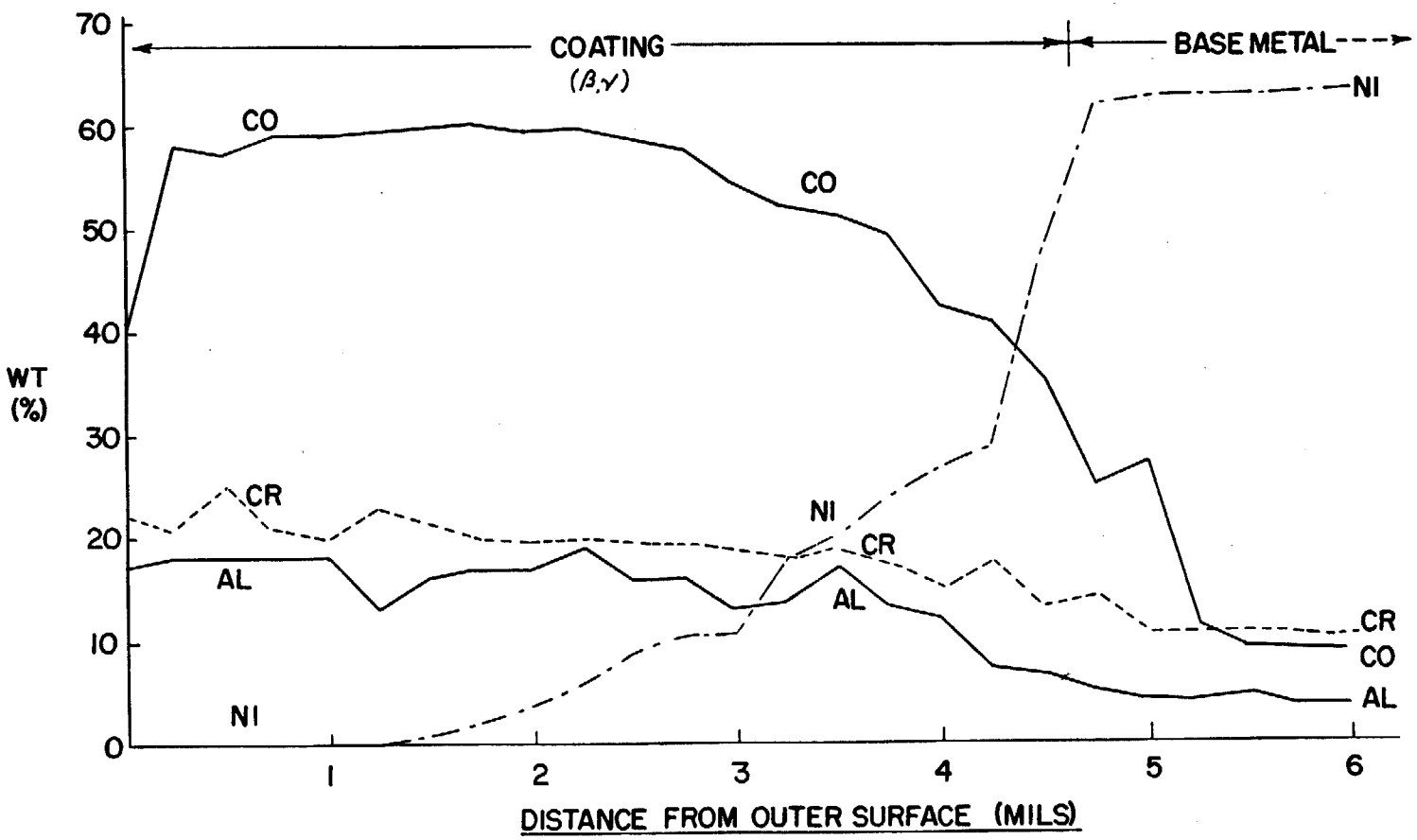
FIG. 4 is an electron microprobe trace depicting the Al, Co, Cr and Ni content in a plasma sprayed CoCrAlY coating according to the present invention; and, FIG. 5 is an electron microprobe trace depicting the Al, Co, Cr and Ni content in a plasma sprayed and aluminized and hot isostatically pressed CoCrAlY coating according to the present invention.
Figure 5:
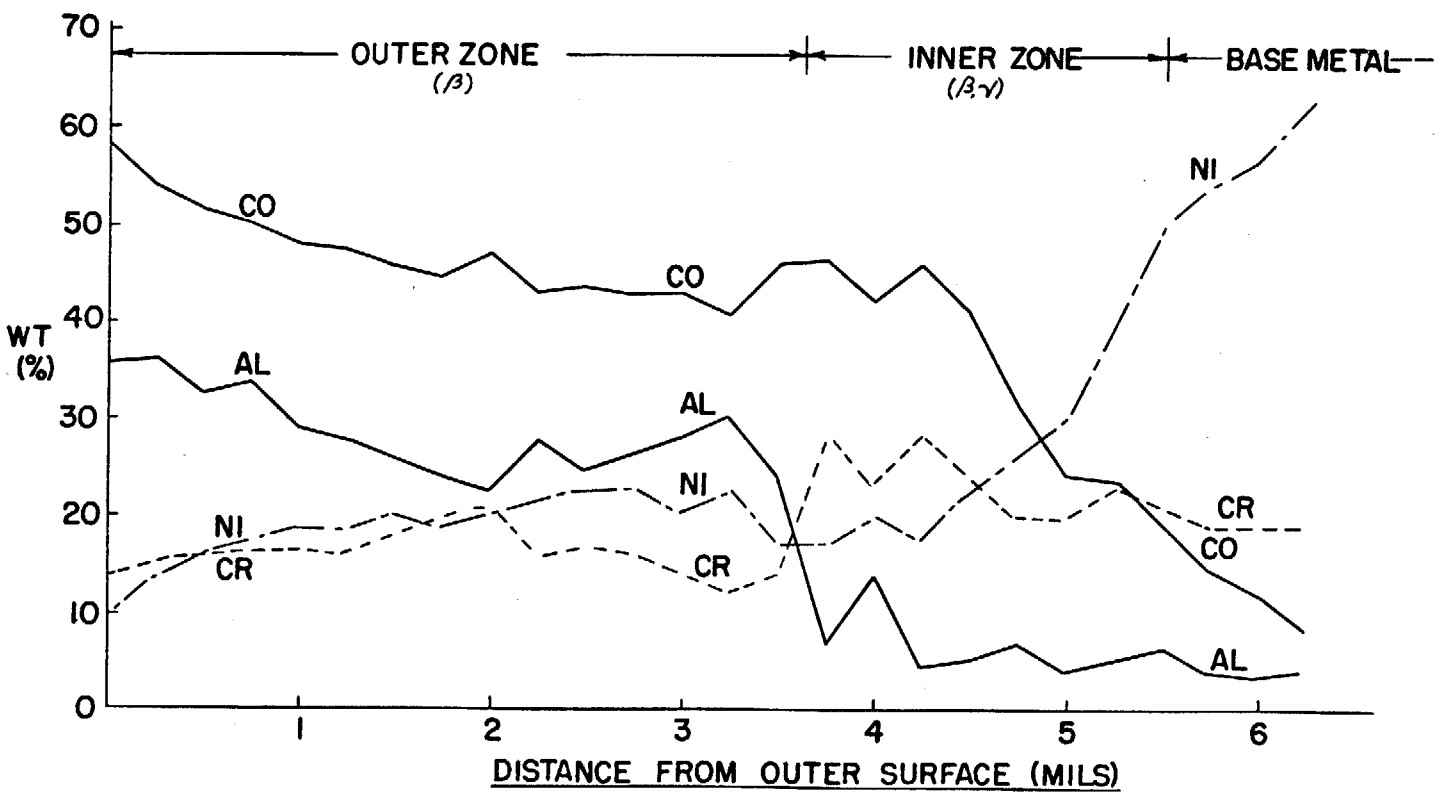

Another microstructural change which occurs when the plasma sprayed coating is subjected to an aluminizing and hot isostatic pressure operation is the modification of the chemical composition of the coating. FIGS. 4 and 5 represent the electron microprobe traces (chemical composition) of Al, Co, Cr and Ni elements for an IN792+Hf substrate after plasma spraying (FIG. 4), and after plasma spraying, aluminizing, and hot isostatic pressng (FIG. 5). As can be noted from these traces, due to the aluminizing and HIPing operations, a concentration gradient of aluminum ranging between about 35 weight percent at the outer edge of the coating to about 5 weight percent at the coating-substrate interface is developed. Also, extensive amounts of nickel ranging between 10 weight percent at the outer edge of the coating and 40 weight percent at the coating-substrate interface has diffused inside the coating. This diffusion of aluminum and nickel has modified the concentration of chromium and cobalt elements in accordance with the thermodynamic stability of (Co,Ni)Al and (Co,Ni) solid solution phases. Thus, extensive modification of the chemical composition of the plasma sprayed CoCrAlY coating takes place after aluminizing and HIPing processes.

The performance of articles coated pursuant to this invention was evalulated by using a 0.7 Mach burner rig testing. The testing cycle was 1750° F./2 minutes; 1450° F./4 minutes; 1750° F./2 minutes; air cool/2 minutes with 5 ppm salt injection into a flame containing 0.2% sulphur. Such testing highlights the sulfidation phenomena and imposes significant thermal stresses on the protection system and the surface oxide.

A comparative graph representing the life of various coatings subjected to above described test conditions is given in FIG. 1. The articles coated in accordance with this invention demonstrated a burner rig life about five times more than a typical aluminide coating and about one and a half to two times greater than lives exhibited by the overlay coatings processed by physical vapor deposition or plasma spray processes.

As indicated, the substantial increase in coating life is attributed to the presence of a large reservoir of aluminum, (Co,Ni)Al phase, in the outer layer of the coating for superior oxidation/corrosion resistance. This layer is supported by a ductile (Co, Ni) solid solution layer thereby providing superior resistance to thermal fatigue. In addition, absence of any defects (porosity) in the coating has left no short circuit paths for corrosion attack to follow; thus increasing the protective capability of the coating in comparison to as plasma sprayed or as plasma sprayed and aluminized CoCrAlY coatings.

Essentially corresponding procedures can be followed with other known coating compositions, for examle, alloys consisting essentially of 15–40 weight percent chromium, 10–25 weight percent aluminum, 0.01 to 5 weight percent of a member selected from the group consisting of the rare earths and yttrium, and the balance iron, cobalt or nickel. Examples of other coating materials and coating processes are found in U.S. Pat. Nos. 3,676,085, 3,754,903, 3,873,347, 3,928,026 and 3,961,098.

It will be understood that various changes and modifications may be made in the above described invention which provide the characteristics of this invention without departing from the spirit thereof particularly as defined in the following claims.

That which is claimed is:

1. In a process for providing a coating on a metallic substrate, the coating renderng the substrate resistent to corrosion at elevated temperatures, said process comprising the steps of providing a ductile metallic overlay on the substrate surface, said overlay being of a composition normally resistant to corrosion at elevated temperatures, and applying an outer layer on said overlay, said outer layer being formed of a material more resistant to corrosion at elevated temperatures, the outer layer comprising an encapsulating means thereby preventing penetration of gas, the improvement comprising the steps of thereafter subjecting said coated substrate to a hot isostatic pressing operation by locating the coated substrate in a pressure-tight chamber, and subjecting the coated substrate to a temperature and pressure applied through a gaseous atmosphere sufficient to eliminate porosity, said temperature and pressure application also causing diffusion of substrate ingredients from one direction into the overlay and diffusion of outer layer ingredients from the other direction into the overlay thereby modifying the composition of the coating composed of said overlay and said outer layer.

2. A process in accordance with claim 1 wherein said outer layer comprises an aluminide coating.

3. A process in accordance with claim 1 wherein said overlay comprises an alloy having as a base constituent at least one of the elements selected from the group consisting of iron, cobalt and nickel.

[4. A process in accordance with claim 3 wherein said overlay is applied to said article surface by one of the methods selected from the group consisting of plasma spraying, pressure bonding, electron beam or vapor deposition, sputtering, ion plating and slurry sintering.]

[5. A process in accordance with claim 3 wherein said aluminide coating is applied by one of the methods selected from the group consisting of pack cementation, dipping, spraying, metallizing, and electrophoresis.]

6. An article produced in accordance with the process of claim 1.

7. A process in accordance with claim 1 wherein the base metal of the substrate alloy is selected from the group consisting of Ni, Co and Fe.

[8. A process in accordance with claim 3 wherein said overlay is applied to said article surface by one of the methods selected from the group consisting of plasma spraying and slurry sintering.]

*9. A process in accordance with claim 2 wherein said aluminide coating is applied by pack cementation, dipping, spraying, metallizing, or electrophoresis.*

*10. A process in accordance with claim 3 wherein said overlay is applied to said article surface by plasma spraying, pressure bonding, electron beam or vapor deposition, sputtering, ion plating or slurry sintering.*

*11. A process in accordance with claim 3 wherein said overlay is applied to said article surface by plasma spraying or slurry sintering.*

*12. A method for coating a superalloy substrate with an oxidation-corrosion protective MCrAlY type coating where M is selected from the group consisting of nickel, cobalt and iron, comprising the steps of:*

*(a) plasma spraying the MCrAlY coating onto the superalloy substrate, the coating being characterized as having pores, voids and similar defects, some of which extend to the free surface of the coating, said defects reducing the protectiveness of the coating:*

*(b) sealing the free surface of the MCrAlY coating by providing a metallic envelope thereover, said envelope spanning and sealing the defects which extend to the free surface of the coating*

*(c) hot isostatically pressing the coated substrate at a sufficient pressure and temperature and for a sufficient time to close the defects internal of the MCrAlY coating and those intersecting said free surface and to diffuse at least a portion of the metallic envelope into the MCrAlY coating, closure of said defects and diffusion of said metal envelope into the coating significantly enhancing the oxidation-corrosion protective properties of the coating.*

*13. The method of claim 12 wherein the metallic coating is aluminum.*

*14. The method of claim 12 wherein the metallic envelope is provided by electroplating the free surface to deposit a metallic coating thereon.*

* * * * *